(12) United States Patent
Harayama et al.

(10) Patent No.: US 10,026,933 B2
(45) Date of Patent: Jul. 17, 2018

(54) NONAQUEOUS ELECTROLYTE BATTERY AND MANUFACTURING METHOD THEREOF

(71) Applicant: TOYOTA JIDOSHA KABUSHIKI KAISHA, Toyota-shi, Aichi-ken (JP)

(72) Inventors: Takashi Harayama, Toyota (JP); Koji Takahata, Nissin (JP); Tomohide Sumi, Nagoya (JP); Yoshio Matsuyama, Nissin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 43 days.

(21) Appl. No.: 14/913,593

(22) PCT Filed: Aug. 20, 2014

(86) PCT No.: PCT/IB2014/001554
§ 371 (c)(1),
(2) Date: Feb. 22, 2016

(87) PCT Pub. No.: WO2015/025209
PCT Pub. Date: Feb. 26, 2015

(65) Prior Publication Data
US 2016/0204393 A1    Jul. 14, 2016

(30) Foreign Application Priority Data

Aug. 23, 2013 (JP) ................................. 2013-173372

(51) Int. Cl.
*H01M 2/00* (2006.01)
*H01M 2/02* (2006.01)
(Continued)

(52) U.S. Cl.
CPC .......... *H01M 2/0262* (2013.01); *H01G 11/10* (2013.01); *H01G 11/74* (2013.01);
(Continued)

(58) Field of Classification Search
CPC ....................................................... H01M 4/02
See application file for complete search history.

(56) References Cited

U.S. PATENT DOCUMENTS

2010/0203373 A1    8/2010   Kawase et al.
2010/0209750 A1*   8/2010   Nagamatsu ......... H01M 2/0262
                                                                    429/94
(Continued)

FOREIGN PATENT DOCUMENTS

CN    101765931 A    6/2010
CN    102034949 A    4/2011
(Continued)

*Primary Examiner* — Jacob Marks
(74) *Attorney, Agent, or Firm* — Sughrue Mion, PLLC

(57) ABSTRACT

A nonaqueous electrolyte battery provided by the present invention includes: an electrode body (80) having a flat shape and including a positive electrode and a negative electrode (60); a square-shaped battery case (30) configured to accommodate therein the electrode body (80) and a nonaqueous electrolyte; and a negative electrode collector terminal (94) placed in the battery case (30) and connected to the negative electrode (60) of the electrode body (80). The negative electrode collector terminal (94) is mainly made of copper or copper alloy. An insulator film (10) configured to insulate the battery case (30) from the electrode body (80) is placed between an inner wall (30*a*) of the battery case (30) and the electrode body (80). The insulator film (10) is joined to the inner wall (30*a*) of the battery case (30), and the insulator film (10) is placed so as not to make contact with the negative electrode collector terminal (94).

3 Claims, 8 Drawing Sheets

(51) Int. Cl.
  *H01M 10/04*    (2006.01)
  *H01M 2/10*     (2006.01)
  *H01M 2/26*     (2006.01)
  *H01M 2/36*     (2006.01)
  *H01M 10/0525*  (2010.01)
  *H01M 10/0587*  (2010.01)
  *H01G 11/10*    (2013.01)
  *H01G 11/74*    (2013.01)
  *H01G 11/78*    (2013.01)
  *H01G 11/82*    (2013.01)

(52) U.S. Cl.
  CPC ............ *H01G 11/78* (2013.01); *H01G 11/82* (2013.01); *H01M 2/0217* (2013.01); *H01M 2/0275* (2013.01); *H01M 2/0277* (2013.01); *H01M 2/0285* (2013.01); *H01M 2/0287* (2013.01); *H01M 2/1077* (2013.01); *H01M 2/263* (2013.01); *H01M 2/362* (2013.01); *H01M 10/049* (2013.01); *H01M 10/0431* (2013.01); *H01M 10/0525* (2013.01); *H01M 10/0587* (2013.01); *H01M 2220/20* (2013.01); *Y02E 60/13* (2013.01)

(56) References Cited

U.S. PATENT DOCUMENTS

2012/0156536 A1    6/2012  Yamazaki et al.
2012/0328917 A1*  12/2012  Sakashita ............ H01M 10/052
                                                        429/82

FOREIGN PATENT DOCUMENTS

| CN | 102484237 A  | 5/2012 |
| JP | 2009-026704 A | 2/2009 |
| JP | 2009-087812 A | 4/2009 |
| JP | 2010-198946 A | 9/2010 |
| JP | 2012-178235 A | 9/2012 |
| JP | 2013-037816 A | 2/2013 |
| JP | 2013-157085 A | 8/2013 |

* cited by examiner

NONAQUEOUS ELECTROLYTE BATTERY AND MANUFACTURING METHOD THEREOF

BACKGROUND OF THE INVENTION

1. Field of the Invention

The present invention relates to a battery (a nonaqueous electrolyte battery) including a nonaqueous electrolyte, and a manufacturing method thereof.

2. Description of Related Art

A lithium ion secondary battery and the like nonaqueous electrolyte secondary battery become more important as a vehicle-mounted power supply or a power supply for a PC, a portable terminal, or the like. Particularly, the lithium ion secondary battery that is lightweight and has a high energy density is preferably used as a vehicle-mounted high-output power supply. As this type of battery, there has been known a battery structure including a wound, electrode body obtained by laminating and winding a sheet-shaped positive electrode, a sheet-shaped negative electrode, and separators. Further, from a viewpoint that a physical strength is large, a metal case is used as a battery case. In this case, in order to insulate the battery case from the electrode body, the electrode body is typically wrapped by an insulating film. For example, Japanese Patent Application Publication No. 2009-026704 (JP 2009-026704 A) describes a battery including an electrode body and a battery case and configured such that an insulator film is placed between the electrode body and the battery case.

SUMMARY OF THE INVENTION

In this type of battery, a positive electrode collector terminal and a negative electrode collector terminal are joined to respective active material uncoated parts formed in respective ends of a positive electrode collector and a negative electrode collector (for example, foil-shaped collectors). For example, the positive electrode collector terminal is made of aluminum, and the negative electrode collector terminal is made of copper. In terms of such a configuration, an inventor(s) of the present invention found that when the insulator film makes contact with the negative electrode collector terminal inside the battery case, the insulator film is affected by copper poisoning of the negative electrode collector terminal, and causes performance deterioration. In order to secure an insulating property between the battery case and the electrode body, the deterioration of the insulator film due to the copper poisoning should be restrained as much as possible.

A first aspect of the present invention relates to a nonaqueous, electrolyte battery. The nonaqueous electrolyte battery includes an electrode body, a battery case, a negative electrode collector terminal and an insulator film. The electrode body includes a positive electrode and a negative electrode. The electrode body has a flat shape. The battery case is configured to accommodate the electrode body and a nonaqueous electrolyte. The battery case has a square shape. The negative electrode collector terminal is disposed in the battery case. The negative electrode collector terminal is connected to the negative electrode of the electrode body. The negative electrode collector terminal contains copper or copper alloy. An insulator film is disposed between an inner wall of the battery case and the electrode body. The insulator film is configured to insulate the battery case from the electrode body. The insulator film is joined to the inner wall of the battery case. The insulator film is disposed not to make contact with the negative electrode collector terminal.

According to such a configuration, the insulator film is fixed to the inner wall of the battery case, which hardly causes such a situation that the insulator film interferes with the negative electrode collector terminal. This makes it possible to moderate such a problem that performance deterioration (e.g., performance deterioration of the insulator film due to copper poisoning) occurs due to interference, between the insulator film and the negative electrode collector terminal. Accordingly, it is possible to provide a battery with higher quality.

In the nonaqueous electrolyte battery, the insulator film may be joined to the inner wall of the battery case, and the insulator film may not be joined to the electrode body. Further, the insulator film may be welded to the inner wall of the battery case, but may not be welded to the electrode body. According to such a configuration, it is possible to surely prevent interference between the insulator film and the negative electrode collector terminal.

In the nonaqueous electrolyte battery, the battery case may include a case main body and a cover configured to close an opening of the case main body. The case main, body may have a pair of wide surfaces opposed to flat surfaces of the electrode body, and a pair of narrow surfaces adjacent to the wide surfaces. The insulator film may be joined to inner walls of the wide surfaces. The insulator film may not be joined to inner walls of the narrow surfaces. According to such a configuration, it is possible to easily and effectively prevent interference between the insulator film and the negative electrode collector terminal.

In the nonaqueous electrolyte battery, the electrode body may be a wound electrode body. The wound electrode body may include a positive electrode sheet, a negative electrode sheet, and a separator provided between the positive electrode sheet and the negative electrode sheet. The positive electrode sheet, the negative electrode sheet and the separator may, be laminated and wound. The positive electrode sheet may include a positive electrode collector having a band shape, and a positive-electrode active material layer provided on the positive electrode collector. The negative electrode sheet may include a negative electrode collector having a band shape, and a negative-electrode active material layer provided on the negative electrode collector. The negative electrode collector may have a non-forming part in one end of the negative electrode collector in a direction of a winding axis of the wound electrode body. The negative-electrode active material layer may not be provided in the non-forming part of the negative electrode collector. The non-forming part may include a thin portion compressed in a thickness direction of the wound electrode body, and a thick portion that is thicker than the thin portion. The negative electrode collector terminal may include a flat part and an extending part. The flat part may be welded to the thin portion. The extending part may be bent to extend from the flat part along an outer shape of the thick portion. The extending part of the negative electrode collector terminal tends to interfere with the insulator film. However, according to the above configuration, since the insulator film is joined to the inner wall of the battery case, it is possible to surely prevent interference between the insulator film and the negative electrode collector terminal.

A second aspect of the present invention relates to a manufacturing method of the nonaqueous electrolyte battery. The manufacturing method includes: a first step (a placing step α) of accommodating the electrode body and the insulator film in the battery case such that the insulator film is disposed between the inner wall of the battery case and the electrode body; a second step (a joining step β) of, after the first step, heating the battery case while applying a constraint load to an outer surface of the battery case, so as to join the insulator film to the inner wall of the battery case; and a third step (an injection step γ) of, after the second step, injecting the nonaqueous electrolyte into the battery case. According to such a configuration, it is possible to join the insulator film to the battery case without impairing an effect obtained by use of the insulator film.

In the second step of the manufacturing method, the constraint load to be applied to the battery case may be 1 kN or more. When the load is such a level, it is possible to surely joint the battery case to the insulator film. In the second step of the manufacturing method, a heating temperature of the battery case may be 100° C. or more, and a heating time of the battery case may be 30 minutes or more. In the second step of the manufacturing method, the heating temperature of the battery case may be 130° C. or less, and the heating time of the battery case may be 5 hours or less. With such a heating temperature and such a heating time, it is possible to surely joint the battery case to the insulator film.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
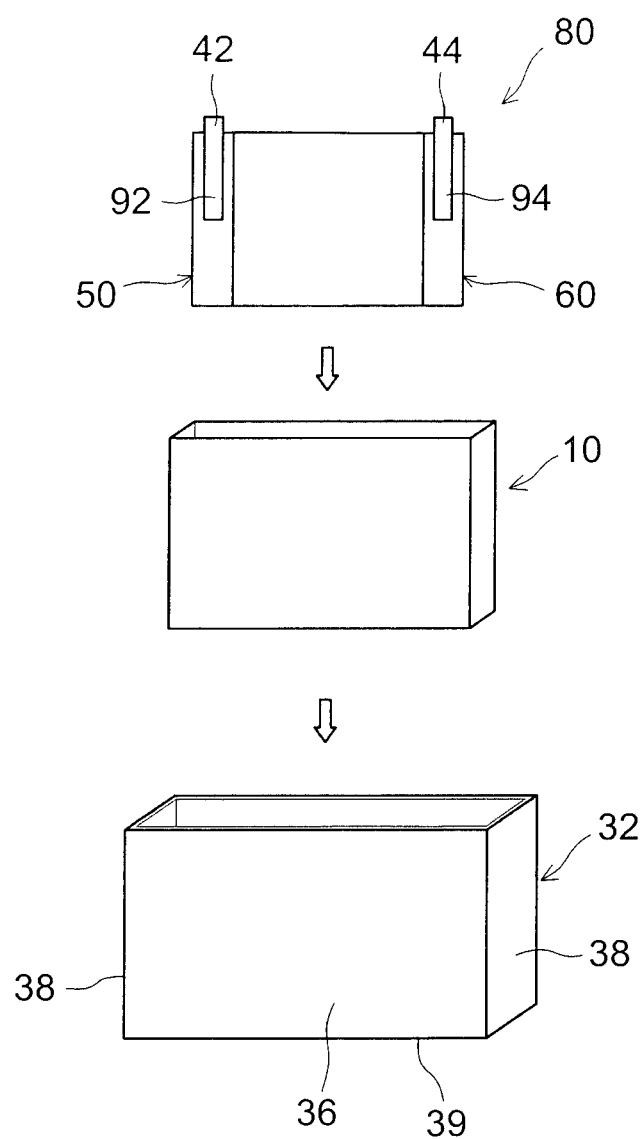
FIG. 1 is an exploded perspective view schematically illustrating a configuration of a lithium ion secondary battery.

An embodiment of the present invention will be described below with reference to the drawings. In the drawings to be described below, the same reference sign is assigned to members/parts that yield the same effect. Further, sizes (length, width, thickness, and the like) in each drawing do not show actual sizes.

Note that a "secondary battery" in the present specification indicates a general electrical storage device that is chargeable and dischargeable repeatedly, and is a term that covers a storage battery such as a lithium ion secondary battery and a storage element such as an electric double layer capacitor. Further, a "nonaqueous electrolyte secondary battery" indicates a battery including a nonaqueous electrolyte (typically, an electrolyte in which supporting salt (supporting electrolyte) is contained in a nonaqueous solvent). Further, a "lithium ion secondary battery" indicates a secondary battery that uses lithium ions as electrolyte ions and performs charging and discharging by migration of lithium ions between positive and negative electrodes. Further, an electrode active material indicates a material that can reversibly store and release chemical spices (lithium ions in the lithium ion secondary battery) serving as carriers. The following more specifically describes a structure of a battery of the present invention by taking, as an example, a square-shaped lithium ion secondary battery. However, it is not intended to limit the present invention to what is described in the following embodiment.

Figure 2:
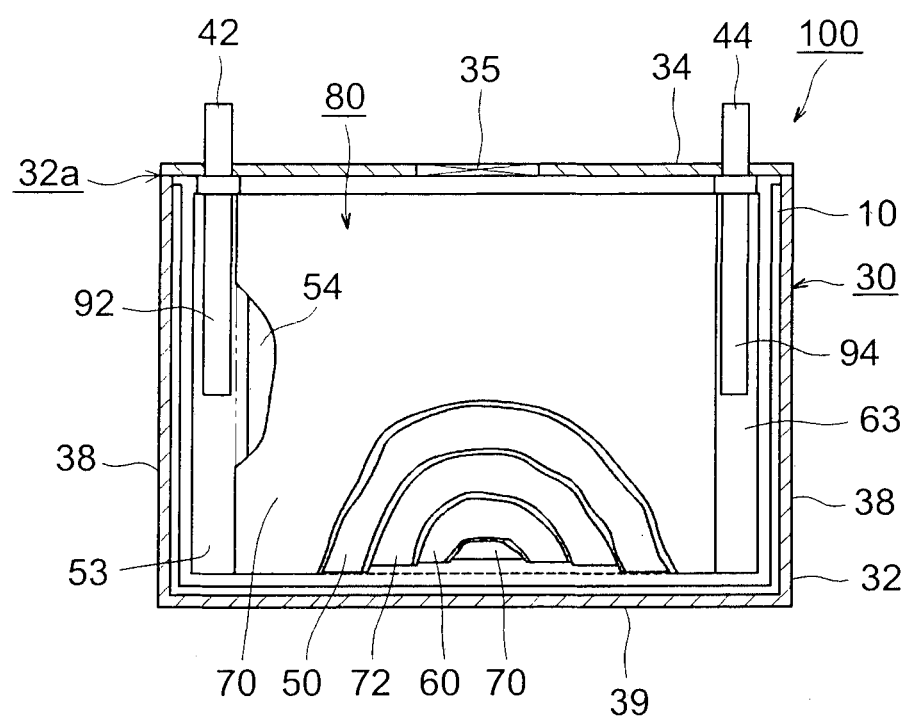
FIG. 2 is a view schematically illustrating the configuration of the lithium ion secondary battery.

FIG. 1 is an exploded perspective view schematically illustrating a configuration of a lithium ion secondary battery 100 according to the present embodiment. FIG. 2 illustrates the lithium ion secondary battery 100. As illustrated in FIGS. 1 and 2, the lithium ion secondary battery 100 includes an electrode body 80, a battery case 30, and an insulator film 10. The electrode body 80 of the present embodiment is constituted by predetermined battery components (respective active materials for positive and negative electrodes, respective collectors for the positive and negative electrodes, separators, and so on). Here, the after-mentioned wound electrode body 80 having a flat shape is used as the electrode body 80.

Figure 3:
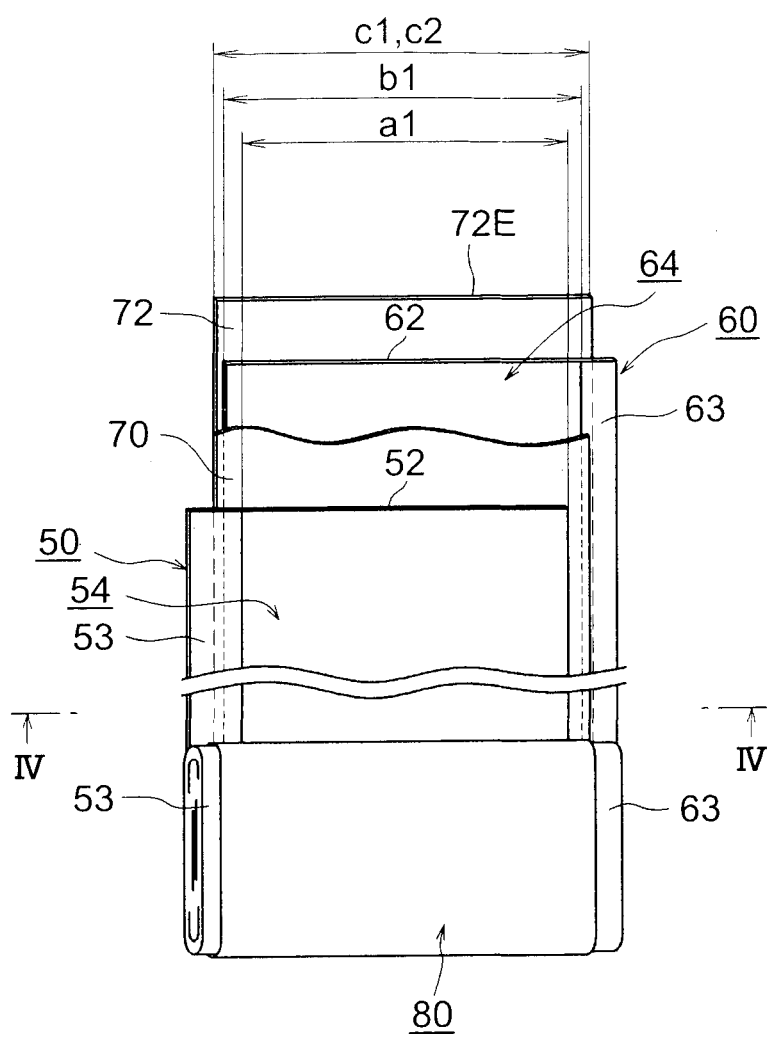
FIG. 3 is a view illustrating a wound electrode body of the lithium ion secondary battery.
Figure 4:
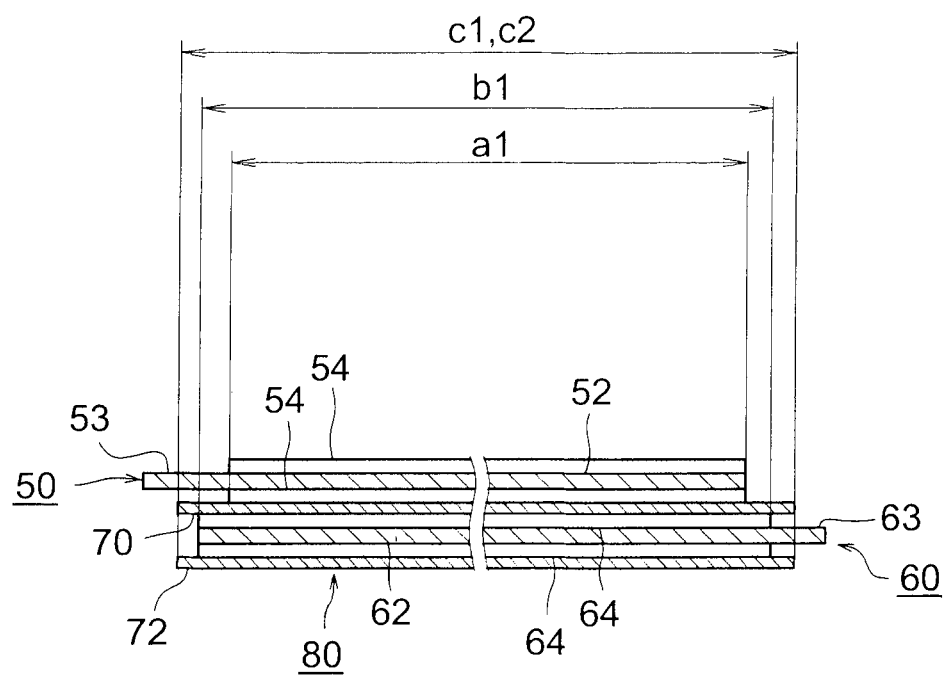
FIG. 4 is a sectional view taken along a line IV-IV in FIG. 3.

FIG. 3 is a view illustrating the wound electrode body 80. FIG. 4 is a sectional view taken along a line IV-IV in FIG. 3. As illustrated in FIG. 3, the wound electrode body 80 includes a positive electrode sheet 50, a negative electrode sheet 60, and separators 70, 72. The positive electrode sheet 50, the negative electrode sheet 60, and the separator 70, 72 are sheet materials having a band-like shape.

<<Positive Electrode Sheet 50>>

As illustrated in FIG. 3, the positive electrode sheet 50 includes a positive electrode collector 52 (a positive-electrode core material) having a band-like shape. A metal foil suitable for a positive electrode can be preferably used as the positive electrode collector 52, for example. An aluminum foil having a band-like shape with a predetermined width is used as the positive electrode collector 52. Further, the positive electrode sheet 50 includes a positive-electrode active material layer non-forming part (uncoated part) 53 and a positive-electrode active material layer 54. The positive-electrode active material layer non-forming part 53 is set along an edge of one side of the positive electrode collector 52 in a width direction thereof. The positive-electrode active material layer 54 is a layer including a positive-electrode active material. The positive-electrode active material layer 54 is formed on either side of the positive electrode collector 52 except for the positive-electrode active material layer non-forming part 53 set in the positive electrode collector 52.

<<Negative Electrode Sheet 60>>

As illustrated in FIG. 3, the negative electrode sheet 60 includes a negative electrode collector 62 (a negative-electrode core material) having a band-like shape. A metal foil suitable for a negative electrode can be preferably used as the negative electrode collector 62, for example. A copper foil having a band-like shape with a predetermined width is used as the negative electrode collector 62. Further, the negative electrode sheet 60 includes a negative-electrode active material layer non-forming part (uncoated part) 63 and a negative-electrode active material layer 64. The negative-electrode active material layer non-forming part 63 is set along an edge of one side of the negative electrode collector 62 in a width direction thereof. The negative-electrode active material layer 64 is a layer including a negative-electrode active material. The negative-electrode active material layer 64 is formed on either side of the negative electrode collector 62 except for the negative-electrode active material layer non-forming part 63 set in the negative electrode collector 62.

<<Separators 70, 72>>

The separators 70, 72 are members that separate the positive electrode sheet 50 from the negative electrode sheet 60. In this example, the separators 70, 72 are each made from a sheet material having a plurality of minute pores and having a band-like shape with a predetermined width. Examples of the separators 70, 72 are a monolayer-structure separator and a laminated-structure separator each made from porous polyolefin resin.

<<Wound Electrode Body 80>>

Figure 5:
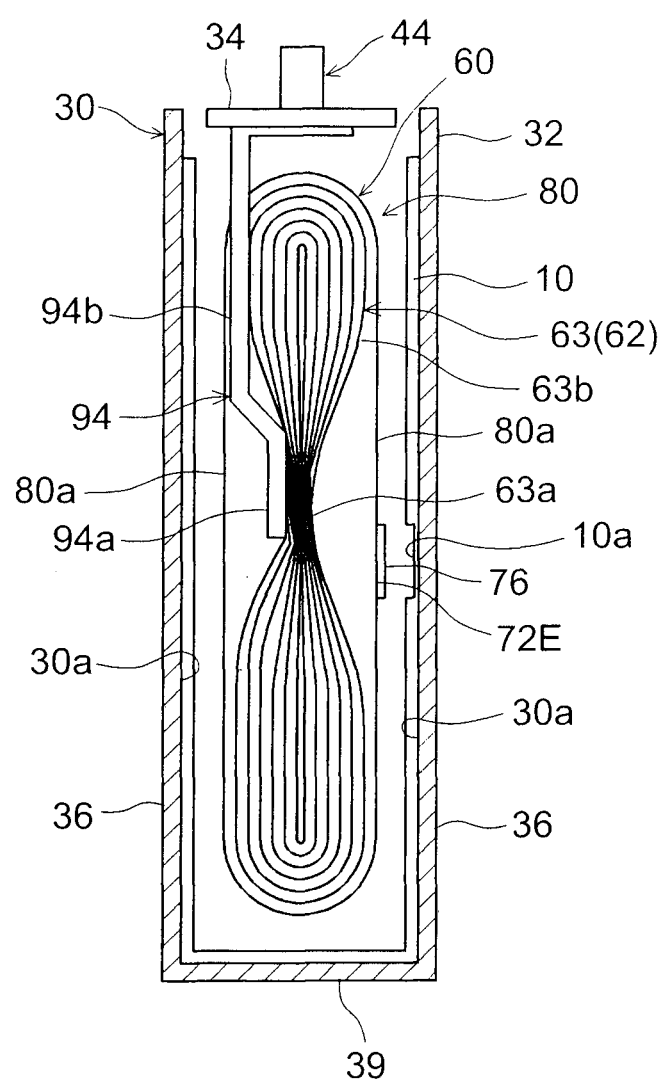
FIG. 5 is a side view illustrating a welding part between a negative-electrode active material layer non-forming part of the wound electrode body and a negative electrode collector terminal.

The wound electrode body 80 is an electrode body configured by laminating and winding the positive electrode sheet 50 and the negative electrode sheet 60 with the separators 70, 72 being provided between the positive-electrode active material layer 54 and the negative-electrode active material layer 64. In the present embodiment, as illustrated in FIGS. 3 and 4, a width b1 of the negative-electrode active material layer 64 is slightly larger than a width a1 of the positive-electrode active material layer 54. Further, widths c1, c2 of the separators 70, 72 are slightly larger than the width b1 of the negative-electrode active material layer 64 (c1, c2>b1>a1). The positive electrode sheet 50, the negative electrode sheet 60, and the separators 70, 72 are aligned in a lengthwise direction, and are laminated in the order of the positive electrode sheet 50, the separator 70, the negative electrode sheet 60, and the separator 72. Further, they are laminated so that the positive-electrode active material layer non-forming part (uncoated part) 53 of the positive electrode sheet 50 and the negative-electrode active material layer non-forming part (uncoated part) 63 of the negative electrode sheet 60 protrude toward different sides opposite to each other in a width direction of the separators 70, 72. The sheet materials thus laminated are wound around a winding axis set in the width direction. In the present, embodiment, the positive electrode sheet 50, the negative electrode sheet 60, and two separators 70, 72 are laminated, the wound electrode body 80 having a flat shape (typically having an elliptical swirl section) is formed, and then, an end part 72E (FIG. 3) of a sheet (the separator 72 in this case) placed on an outermost circumference among those sheets is fixed to an outer surface of the wound electrode body 80 by an adhesion tape material 76 (FIG. 5). This makes it possible to prevent raveling of the wound electrode body 80, and to maintain a good winding state. In this example, the tape material 76 (FIG. 5) is fixed to a flat surface 80a of the wound electrode body 80.

<<Battery Case 30>>

As illustrated in FIG. 2, the battery case 30 of the present embodiment is a square-shaped (typically, rectangular solid) battery case having eight corners, and is formed so that its internal space has a box shape corresponding to the electrode body 80. The battery case 30 includes a case main body 32 and a cover 34. The case main body 32 has a bottomed square tubular shape, and is a flat box-shaped container in which one side surface (a top surface) is opened. The cover 34 is a member attached to the opening (the opening on the top surface) of the case main body 32 so as to close the opening. The case main body 32 can accommodate therein the electrode body 80 and the insulator film 10 through the opening on the top surface. The case main body 32 is constituted by a pair of wide surfaces 36 (FIG. 1) opposed to the flat surface of the wound electrode body 80 accommodated in the case, a pair of narrow surfaces 38 adjacent to the wide surfaces 36, and a bottom face 39. A lightweight metal material having a high strength and a good thermal conductivity is preferable as a material of the battery case 30. Examples of such a metal material include aluminum, stainless steel, nickel plating steel, and the like.

The battery case 30 has a flat rectangular internal space as a space in which to accommodate the wound electrode body 80. Further, as illustrated in FIGS. 1 and 2, a lateral width of the flat internal space of the battery case 30 is slightly wider than the wound electrode body 80. In the present embodiment, the wound electrode body 80 is accommodated in the internal space of the battery case 30. The wound electrode body 80 is accommodated in the battery case 30 in a state where the wound electrode body 80 is deformed flatly in one direction perpendicular to the winding shaft. Further, a positive electrode terminal 42 and a negative electrode terminal 44 are attached to the cover 34 of the battery case 30. The positive electrode terminal 42 and the negative electrode terminal 44 penetrate through the battery case 30 (the cover 34) so as to project outside the battery case 30. Further, the cover 34 is provided with a relief valve 35.

The wound electrode body 80 is attached to the positive electrode terminal 42 and the negative electrode terminal 44 attached to the battery case 30 (the cover 34 in this example). The wound electrode body 80 is accommodated in the battery case 30 in a state where the wound electrode body 80 is bent flatly by pushing in one direction perpendicular to the winding shaft. Further, the wound electrode body 80 is configured such that the positive-electrode active material layer non-forming part (uncoated part) 53 of the positive electrode sheet 50 and the negative-electrode active material layer non-forming part (uncoated part) 63 of the negative electrode sheet 60 protrude toward different sides opposite to each other in the width direction of the separators 70, 72.

<<Positive Electrode Collector Terminal 92 and Negative Electrode Collector Terminal 94>>

A positive electrode collector terminal 92 is attached to the positive-electrode active material layer non-forming part 53, and is connected to the positive electrode terminal 42. The positive electrode collector terminal 92 is made of aluminum or aluminum alloy, for example. In this example, as illustrated in FIG. 2, the positive electrode collector terminal 92 extends to a central part of the positive-electrode active material layer non-forming part 53 of the wound electrode body 80. A tip end of the positive electrode collector terminal 92 is joined (by welding in this example) to the central part of the positive-electrode active material layer non-forming part 53. Further, a negative electrode collector terminal 94 is attached to the negative-electrode active material layer non-forming part 63, and is connected to the negative electrode terminal 44. The negative electrode collector terminal 94 is made of copper or copper alloy, for example. The negative electrode collector terminal 94 extends to a central part of the negative-electrode active material layer non-forming part 63 of the wound electrode body 80. A tip end of the negative electrode collector terminal 94 is joined (by welding in this example) to the central part of the negative-electrode active material layer non-forming part 63. FIG. 5 is a side view illustrating a welding part between the negative-electrode active material layer non-forming part 63 of the wound electrode body 80 and the negative electrode collector terminal 94.

In either side of the separators 70, 72, the positive-electrode active material layer non-forming part 53 of the positive electrode collector 52 and the negative-electrode active material layer non-forming part 63 of the negative electrode collector 62 are exposed in a spiral manner. As illustrated in FIG. 5, the negative-electrode active material layer non-forming part 63 of the negative electrode collector 62 includes: a thin portion 63a formed by compressing (gathering) the negative-electrode active material layer non-forming part 63 in a thickness direction of the wound electrode body 80 so that its thickness is reduced; and a thick portion 63b that is relatively thick in comparison with the thin portion 63a. Further, the negative electrode collector terminal 94 includes: a flat part 94a welded to the thin portion 63a; and an extending part 94b bent to extend from the flat part 94a along an outer shape of the thick portion 63b. An upper end of the extending part 94b of the negative electrode collector terminal 94 is connected to a lower surface of the negative electrode terminal 44. Further, in a side view, the negative electrode collector terminal 94 is placed so as to be closer to an inner side of the case relative to the flat surface 80a of the electrode body 80. Resistance welding is used, for example, for joining between the negative electrode collector terminal 94 and the negative electrode collector 62. Further, ultrasonic welding is used, for example, for joining between the positive electrode collector terminal 92 and the positive electrode collector 52.

<<Insulator Film 10>>

The insulator film 10 configured to insulate the electrode body 80 from the battery case 30 is placed between the electrode body 80 and the battery case 30. Due to the insulator film 10, direct contact between the electrode body 80, which is a power generation element, and the battery case 30 is prevented, thereby making it possible to secure insulation between the electrode body 80 and the battery case 30. A material of the insulator film should be a material that can function as an insulating member, and preferable examples thereof may be resin materials such as polypropylene (PP) and polyethylene (PE). Further, a thickness of the insulator film 10 may be around 100 µm, but can be changed appropriately according to configuration conditions of the battery 100. In the present embodiment, the insulator film 10 is formed in a pouch-like shape surrounding the electrode body 80. More specifically, the insulator film 10 has a bottomed pouch-like shape having an opening on its upper end side, and the electrode body 80 is accommodated therein through the upper end opening. The insulator film 10 is accommodated in the case main body 32 in a state where the electrode body 80 is accommodated therein.

The insulator film 10 is joined to inner walls 30a of the battery case 30. Here, the joining indicates that the insulator film 10 is connected to the battery case 30 so as not to be separated from each other, and includes all types of joining, for example, welding such as thermo compression bonding and joining by use of an adhesive material. In the present embodiment, the insulator film 10 is joined to the inner walls 30a of the battery case 30, but is not welded to the electrode body 80. Further, the insulator film 10 is joined to the inner walls 30a of the wide surfaces 36 in the case main body 32, but is not joined to inner walls of the narrow surfaces 38. That is, the insulator film 10 is joined to only the inner walls 30a of those wide surfaces 36 of the case main body 32 which are opposed to the flat surfaces 80a of the electrode body 80.

Figure 6:
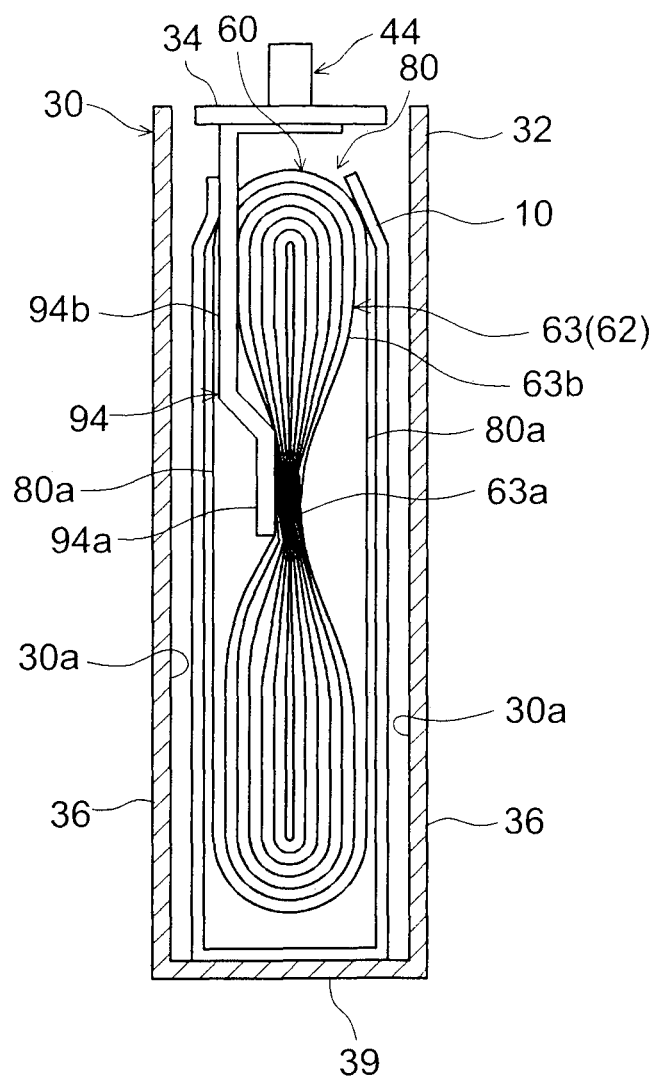
FIG. 6 is a side view illustrating a welding part between a negative-electrode active material layer non-forming part of the wound electrode body and a negative electrode collector terminal.

With the use of the insulator film 10 thus configured, such a problem is moderated that performance deterioration (e.g., performance deterioration of the insulator film 10 due to copper poisoning) occurs due to interference between the insulator film 10 and the negative electrode collector terminal 94. That is, as illustrated in FIG. 5, in the technique described herein, the negative-electrode active material layer non-forming part 63 of the negative electrode collector 62 is constituted by: the thin portion 63a formed by gathering the negative-electrode active material layer non-forming part 63 in the thickness direction of the wound electrode body 80 so that its thickness is reduced; and the thick portion 63b that is relatively thick in comparison with the thin portion 63a. Further, the negative electrode collector terminal 94 includes: the flat part 94a joined to the thin portion 63a of the negative-electrode active material layer non-forming part 63; and the extending part 94b bent to extend from the flat part 94a along the outer shape of the thick portion 63b. In the battery configured as such, in a case where the insulator film 10 is not joined to the inner walls 30a of the battery case 30 as illustrated in FIG. 6, the insulator film 10 may interfere with the extending part 94b of the negative electrode collector terminal 94. When the insulator film 10 interferes with the extending part 94b of the negative electrode collector terminal 94, the insulator film 10 is affected by copper poisoning of the negative electrode collector terminal 94, which might cause performance deterioration. That is, such a problem may occur that an insulating property between the battery case 30 and the electrode body 80 cannot be secured.

In contrast, according to the present configuration, the insulator film 10 is joined to the inner walls (in this example, the inner walls of the case wide surfaces 36) 30a of the battery case 30 as illustrated in FIG. 5. According to such a configuration, the insulator film 10 is fixed to the inner walls 30a of the battery case 30, which hardly causes such a situation that the insulator film 10 interferes with the negative electrode collector terminal 94. This makes it possible to moderate such a problem that performance deterioration (e.g., performance deterioration of the insulator film 10 due to copper poisoning) occurs due to interference between the insulator film 10 and the negative electrode collector terminal 94. Accordingly, it is possible to provide the battery 100 with higher quality.

In this case, it is preferable that at least that area of the insulator film 10 which is opposed to the extending part 94b of the negative electrode collector terminal 94 be joined to the inner wall 30a of the battery case 30. This makes it possible to surely prevent interference between the insulator film 10 and the negative electrode collector terminal 94. Further, that area of the insulator film 10 which is opposed to the negative-electrode active material layer non-forming part 63 of the negative electrode collector 62 is preferably joined to the inner wall 30a of the battery case 30. Even when the insulator film 10 makes contact with the negative-electrode active material layer non-forming part 63 of the negative electrode collector 62, performance deterioration of the insulator film 10 due to copper poisoning may occur. However, according to the above configuration, such a situation that the insulator film 10 interferes with the negative-electrode active material layer non-forming part 63 hardly occurs. This accordingly makes it possible to moderate such a problem that performance deterioration occurs due to interference between the insulator film 10 and the negative-electrode active material layer non-forming part 63. Further, it is preferable for that area of the insulator film 10 which is opposed to the flat surface 80a of the electrode body 80 to be joined to the inner wall 30a of the battery case 30. According to the battery configured as such, the aforementioned effect can be yielded particularly well.

<<Manufacturing Method of Battery>>

The lithium ion secondary battery 100 configured as such can be preferably manufactured (configured) generally according to the following procedure, for example.

<<Placing Step α>>

First of all, the electrode body 80 having a flat shape is accommodated in the square-shaped battery case 30 configured as described above, and the insulator film 10 is placed between the inner walls 30a of the battery case 30 and the electrode body 80 (a placing step α). In the present embodiment, the electrode body 80 is accommodated in the pouch-shaped insulator film 10 through the upper end opening. Then, the pouch-shaped insulator film 10 is accommodated in a flat internal space of the case main body 32 in a state where the electrode body 80 is accommodated therein. After the pouch-shaped insulator film 10 and the wound electrode body 80 are accommodated in the case main body 32, the upper end opening of the case main body 32 is closed by the cover 34. Subsequently, a joint 32a (see FIG. 2) between the cover 34 and the case main body 32 is sealed by laser beam welding. As a laser beam used herein, a YAG laser, a fiber laser, a $CO_2$ gas laser, a DOE, laser, a LD laser, and the like can be employed appropriately.

<<Joining Step β>>

Figure 7:
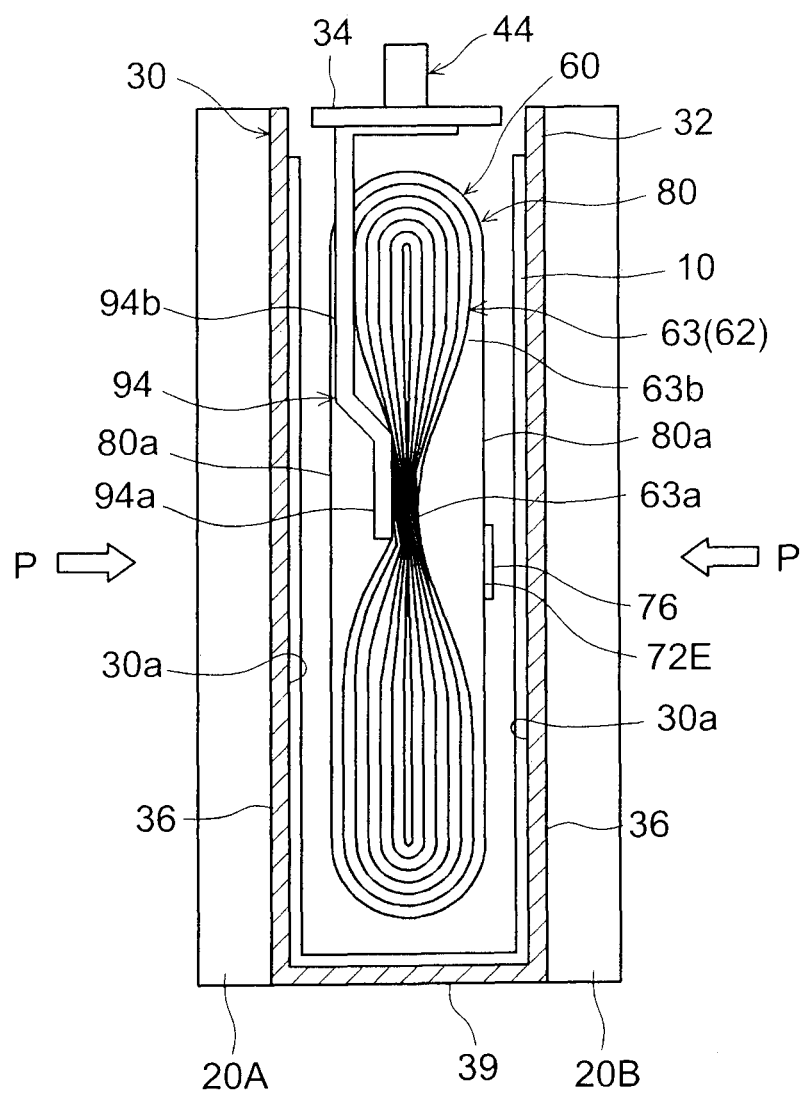
FIG. 7 is a view illustrating a joining step of joining an insulator film to a battery case.

After the insulator film 10 and the wound electrode body 80 are accommodated in the case main body 32 as such, the insulator film 10 is joined to the inner walls 30a of the battery case 30 (a joining step β). In the present embodiment, the joining step β is performed by heating the battery case 30 while applying a load to an outer surface (here, the case wide surfaces 36) of the battery case 30. In the present embodiment, a pair of constraining plates 20A, 20B is placed outside the wide surfaces 36 of the battery case 30, as illustrated in FIG. 7. Further, a beam material (not shown) for tightening is attached so as to bridge the pair of constraining plates 20A, 20B. Ends of the beam material are tightened, by screws or the like, to the constraining plates 20A, 20B, so as to constrain the battery case 30 so that a predetermined load P is applied to the battery case 30 in its thickness direction. While such a constraint state is maintained, the battery case 30 is left in a constant temperature bath of 100° C. or more, for example.

Here, the joining step β is preferably performed so that the load P to be applied to the wide surfaces 36 of the battery case 30 is 1 kN or more. A suitable constraint load P is about 1 kN or more (e.g., 1 kN to 5 kN) and is preferably 1.5 kN or more (e.g., 1.5 kN to 3 kN), depending on the materials or the like of the battery case 30 and the insulator film 10 to be used. Further, the joining step β is preferably performed such that a heating temperature of the battery case 30 is 100° C. or more and a heating time thereof is at least one hour. A suitable heating temperature is about 100° C. or more (e.g., 100° C. to 130° C.), and preferably 100° C. to 110° C., depending on the materials or the like of the battery case 30 and the insulator film 10 to be used. A suitable heating time is about 30 minutes or more (e.g., 30 minutes to 5 hours), for example, 1 hour or more (e.g., 1 to 5 hours), and preferably 30 minutes to 3 hours, for example, 1 to 3 hours. When the constraint load, the heating temperature, and the heating time are within the above ranges, it is possible to join the insulator film 10 to the battery case 30 appropriately.

Note that the joining step β can be also performed as a cell drying step performed in a conventional battery manufacturing process. That is, when water content is included in battery internal components such as a positive electrode, a negative electrode, and a separator, the water content is electrolyzed so that a byproduct may be caused. When a lithium ion secondary battery is manufactured, it is generally necessary to remove water content in advance by drying the battery internal components by heating or the like. In contrast, according to the above configuration, the heating is performed with the battery case 30 being constrained in the joining step β. Accordingly, it is possible to dry and remove the water content included in the battery internal components by heat at the time of the heating. In view of this, it is possible to perform the joining step β also as the cell drying step performed in the conventional battery manufacturing process, thereby making it possible to restrain a decrease of productivity caused by performing the joining step β. Even in this regard, the present invention has a high technical value.

<<Injection Step γ>>

After the insulator film 10 is joined to the battery case 30 as such, a nonaqueous electrolyte is injected into the battery case 30 (an injection step γ). In the present embodiment, the electrolyte is injected into the battery case 30 from an injection hole formed in the cover 34. The electrolyte used in this example is an electrolyte obtained by adding $LiPF_6$ to a mixed solvent of ethylene carbonate and diethyl carbonate (e.g., a mixed solvent with a volume ratio of about 1:1) so that a concentration of $LiPF_6$ is approximately 1 mol/liter. After that, a metal sealing cap is attached to the injection hole (by welding, for example) so as to seal the battery case 30. The lithium ion secondary battery 100 can be manufactured (configured) in this way.

Here, the insulator film 10 made from resin as described above tends to be decreased in heat resistance and mechanical strength. In view of this, if the insulator film 10 is joined to the inner walls 30a of the battery case 30 in advance (or an insulation film or the like is formed in the case inner walls 30a in advance), such problems may occur. That is, at the time when the joint 32a between the cover 34 and the case main body 32 is irradiated with laser to perform welding, the insulator film 10 is heated by heat input and the insulator film 10 is melted, which may cause poor insulation. Further, a void (a minute air bubble) is mixed into a welded portion by gas caused due to melting of the insulator film 10, which may cause poor welding. In contrast, according to the present configuration, after the joint 32a between the cover 34 and the case main body 32 is irradiated with laser to perform welding, the insulator film 10 is joined (welded by thermo compression bonding, in this example) to the battery case 30. Accordingly, it is possible to join the insulator film 10 to the battery case 30 without impairing the effect obtained by use of the insulator film 10.

Note that the material of the wound electrode body 80 itself may be the same as an electrode body of a conventional lithium ion secondary battery, and is not limited in particular.

For example, as illustrated in FIGS. 3 and 4, the positive-electrode active material layer 54 includes a positive-electrode active material, a conductive material, and a binder. A substance used as a positive-electrode active material of a lithium ion secondary battery can be used as the positive-electrode active material. Examples of the positive-electrode active material include: lithium transition metal oxide such as $LiNiCoMnO_2$ (lithium-nickel-cobalt-manganese containing composite oxide), $LiNiO_2$ (lithium nickel oxide), $LiCoO_2$ (lithium cobalt oxide), $LiMn_2O_4$ (lithium manganese oxide), $LiFePO_4$ (lithium iron phosphate), and the like.

Examples of the conductive material are carbon materials such as carbon powder and carbon fiber. One selected from such conductive materials may be used solely, or two or more thereof may be used in combination.

Further, the binder causes particulates of the positive-electrode active material or the conductive material to be bound to each other, or causes these particulates to be bound to the positive electrode collector 52. Such a binder used herein can be a polymer dissolvable or dispersedly soluble in a solvent. For example, in a case of a positive electrode mixture composition using an aqueous solvent, carboxymethyl cellulose (CMC), polytetrafluoro-ethylene (PTFE), vinyl acetate copolymers, styrene-butadiene copolymers (SBR), or the like aqueous or water-dispersible polymers can be preferably used. Further, in a case of a positive electrode mixture composition using a nonaqueous solvent, polyvinylidene fluoride (PVDF) or the like polymers can be preferably used.

The positive-electrode active material layer 54 is formed, for example, such that a positive electrode mixture is formed by mixing the positive-electrode active material and the conductive material with a solvent in a form of paste (slurry), and the positive electrode mixture thus formed is applied to the positive electrode collector 52, dried, and then rolled out. At this time, an aqueous solvent or a nonaqueous solvent can be used as the solvent. A preferred example of the nonaqueous solvent is N-methyl-2-pyrrolidone (NMP).

The negative-electrode active material layer 64 includes a negative-electrode active material, a thickening agent, a binder, and so on. As the negative-electrode active material, it is possible to use one or more substances conventionally used for a lithium ion secondary battery, without any particular limit. A preferable example thereof is a carbon-based material such as graphite carbon. Similarly to the positive electrode, it is possible to prepare a negative electrode mixture by dispersing and kneading the negative-electrode active material and a binder such as PVDF, SBR, PTFE, or CMC with a suitable dispersing medium. The negative-electrode active material layer 64 is formed such that the negative electrode mixture thus prepared is applied to the negative electrode collector 62, and then dried and pressed in a predetermined thickness.

<<Battery Pack>>

Figure 8:
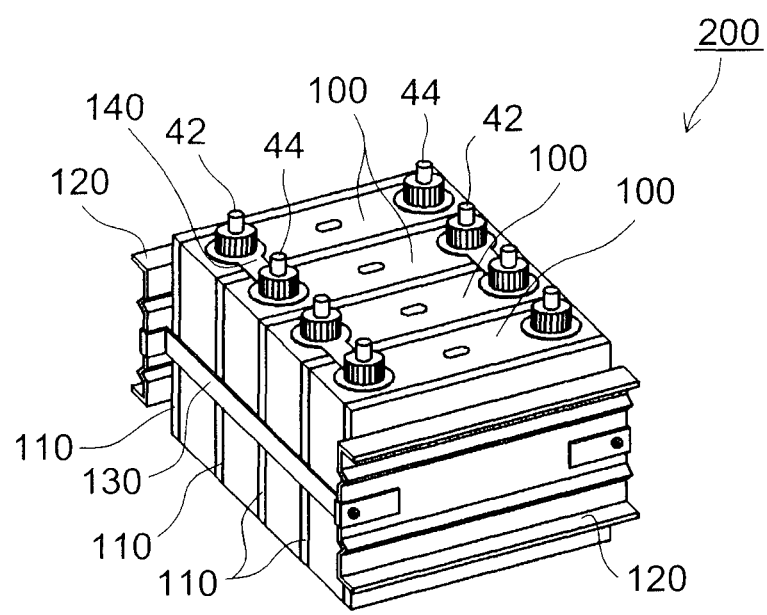
FIG. 8 is a perspective view illustrating a battery pack.

Next will be described an exemplary configuration of a battery pack including a plurality of single cells each of which is the lithium ion secondary battery 100 configured as described above. A battery pack 200 used herein is configured such that, as illustrated in FIG. 8, a plurality of (4 in the figure, but 10 or more, or preferably about 10 to 30 (e.g., 20)) lithium ion secondary batteries (single cells) 100 is placed in a reversing manner so that respective positive electrode terminals 42 and respective negative electrode terminals 44 thereof are placed alternately, and further, the plurality of lithium ion secondary batteries 100 is arranged in a direction (a laminating direction) where wide surfaces 36 (FIG. 1) of battery cases 30 thereof are opposed to each other. Cooling plates 110 each having a predetermined shape are sandwiched between the single cells 100 thus arranged. The cooling plate functions as a heat dissipation member for efficiently radiating heat generated in each of the single cells 100 in use. The cooling plate has a shape that allows a cooling fluid (typically, air) to be introduced into between the single cells 100 (for example, a shape having a surface provided with a plurality of parallel grooves perpendicularly extending from one side of the rectangular cooling plate to its opposite side). A metal cooling plate having a good thermal conductivity or a lightweight and hard cooling plate made from polypropylene or the like synthetic resin is preferably used.

Paired end plates (constraining plates) 120 are provided at both ends of the single cells 100 and the cooling plates 110 thus arranged. The single cells 100 and the cooling plates 110 thus arranged are constrained by those constraint bands 130 for tightening which are attached to bridge the end plates 120, so that a specific constraint load (contact pressure) is applied thereto. Between the single cells 100 adjacent to each other, one positive electrode terminal 42 is electrically connected to the other negative electrode terminal 44 by a connecting member (bus bar) 140.

As illustrated in FIGS. 1 to 5, in the battery pack 200 according to the present embodiment, each of the single cells 100 is configured such that an insulator film 10 is joined to an inner wall 30a of a battery case 30. On that account, when the battery pack 200 is configured by use of the lithium ion secondary batteries 100, misalignment of the insulator film 10 is hard to occur in each of the single cells 100. Accordingly, in each of the single cells 100, it is possible to secure an insulating property between an electrode body 80 and the battery case 30. Further, even in a case where one or more single cells 100 are replaced for repair or the like after the battery pack 200 is configured, misalignment of the insulator film 10 is hard to occur in the single cell(s) 100 to be replaced. Hereby, it is possible to surely secure the insulating property between the electrode body 80 and the battery case 30.

As illustrated in FIGS. 3 and 5, in the battery pack 200 according to the present embodiment, each of the single cells 100 is configured such that a positive electrode sheet 50, a negative electrode sheet 60, and two separators 70, 72 are laminated to form a wound electrode body 80 having a flat shape, and then, an end part 72E of a sheet (the separator 72 in this case) placed on an outermost circumference among those sheets is fixed to an outer surface of the wound electrode body 80 by an adhesion tape material 76. In each of the single cells 100, the tape material 76 is placed on a part that receives the constraint load, more specifically, that flat surface 80a of the wound electrode body 80 which is opposed to the wide surface 36 of the battery case 30.

When the tape material 76 is placed on the flat surface 80a of the wound electrode body 80 as such, a step may be formed in an outer surface part of the wound electrode body 80. If such a step is formed in that part of the wound electrode body 80 which substantially receives the constraint load, a pressure (contact pressure) that the wound electrode body receives due to the constraint load could vary between the step part (that is, a part where the tape material exists) and its vicinal part. Such unevenness in the load pressure (contact pressure) causes unevenness in how the pressure is applied in the wound electrode body 80, which eventually causes unevenness in distribution of a battery component such as an electrolyte inside the wound electrode body 80. This may result in a decrease in cycle characteristics of the single cell (a property related to a capacity change caused when charging and discharging is repeated).

In contrast, in the battery pack 200 according to the present embodiment, each of the single cells 100 is configured such that the battery case 30 is heated with a load being applied to the wide surfaces 36 of the battery case 30 in the joining step β as illustrated in FIG. 7. Due to the load applied at the time of joining, that part of the insulator film 10 which makes contact with the tape material 76 is partially compressed, and a thin recessed portion 10a that is locally thinned is formed, as illustrated in FIG. 5. By fitting the tape material 76 fitting into the thin recessed portion 10a, it is possible to prevent unevenness in the constraint load (contact pressure) at the time of manufacturing the battery pack. Accordingly, in the battery pack 200 thus configured, it is possible to uniform a constraint load pressure (contact pressure) to be applied to the wound electrode body 80 (the flat surface 80*a*) in each of the single cells 100. As a result, any deficiency due to the unevenness in the constraint load (contact pressure) does not occur, thereby making it possible to achieve excellent cycle characteristics and output characteristics, and to realize longer life.

The lithium ion secondary battery according to one embodiment of the present invention has been described above. However, the secondary battery according to the present invention is not limited to any embodiment described above, and various modifications can be made.

As described above, the present invention can contribute to performance improvement of a battery (e.g., a lithium ion secondary battery). The present invention is preferably applicable to a lithium ion secondary battery for a vehicle drive power supply, such as a driving battery for a hybrid vehicle and an electric vehicle. That is, the lithium ion secondary battery is preferably usable as a vehicle drive power supply configured to drive a motor (an electric motor) of a vehicle such as an automobile. The vehicle drive power supply may be a battery pack-including a plurality of secondary batteries in combination.

The invention claimed is:

1. A nonaqueous electrolyte battery comprising:
an electrode body including a positive electrode and a negative electrode, the electrode body having a flat shape;
a battery case configured to accommodate the electrode body and a nonaqueous electrolyte, the battery case having a square shape;
a negative electrode collector terminal disposed in the battery case, the negative electrode collector terminal connected to the negative electrode of the electrode body, and the negative electrode collector terminal containing copper or copper alloy; and
an insulator film disposed between an inner wall of the battery case and the electrode body, the insulator film configured to insulate the battery case from the electrode body and the insulator film disposed not to make contact with the negative electrode collector terminal, wherein
the battery case includes a case main body and a cover configured to close an opening of the case main body,
the case main body has a pair of wide surfaces opposed to flat surfaces of the electrode body, and a pair of narrow surfaces adjacent to the wide surfaces,
the insulator film is joined to inner walls of the wide surfaces, and
the insulator film is not joined to inner walls of the narrow surfaces.

2. The nonaqueous electrolyte battery according to claim 1, wherein
the insulator film is not joined to the electrode body.

3. A nonaqueous electrolyte battery comprising:
an electrode body including a positive electrode and a negative electrode, the electrode body having a flat shape;
a battery case configured to accommodate the electrode body and a nonaqueous electrolyte, the battery case having a square shape;
a negative electrode collector terminal disposed in the battery case, the negative electrode collector terminal connected to the negative electrode of the electrode body, and the negative electrode collector terminal containing copper or copper alloy; and
an insulator film disposed between an inner wall of the battery case and the electrode body, the insulator film configured to insulate the battery case from the electrode body, the insulator film joined to the inner wall of the battery case, and the insulator film disposed not to make contact with the negative electrode collector terminal, wherein
the electrode body is a wound electrode body,
the wound electrode body includes a positive electrode sheet, a negative electrode sheet, and a separator provided between the positive electrode sheet and the negative electrode sheet,
the positive electrode sheet, the negative electrode sheet and the separator are laminated and wound,
the positive electrode sheet includes a positive electrode collector having a band shape, and a positive-electrode active material layer provided on the positive electrode collector,
the negative electrode sheet includes a negative electrode collector having a band shape, and a negative-electrode active material layer provided on the negative electrode collector,
the negative electrode collector has a non-forming part in one end of the negative electrode collector in a direction of a winding axis of the wound electrode body,
the negative-electrode active material layer is not provided in the non-forming part of the negative electrode collector,
the non-forming part includes a thin portion compressed in a thickness direction of the wound electrode body, and a thick portion that is thicker than the thin portion,
the negative electrode collector terminal includes a flat part and an extending part,
the flat part is welded to the thin portion, and
the extending part is bent to extend from the flat part along an outer shape of the thick portion.

* * * * *